March 7, 1950 J. S. WEBB 2,499,550
HAY AND BRUSH RAKE
Filed July 15, 1946 2 Sheets-Sheet 1
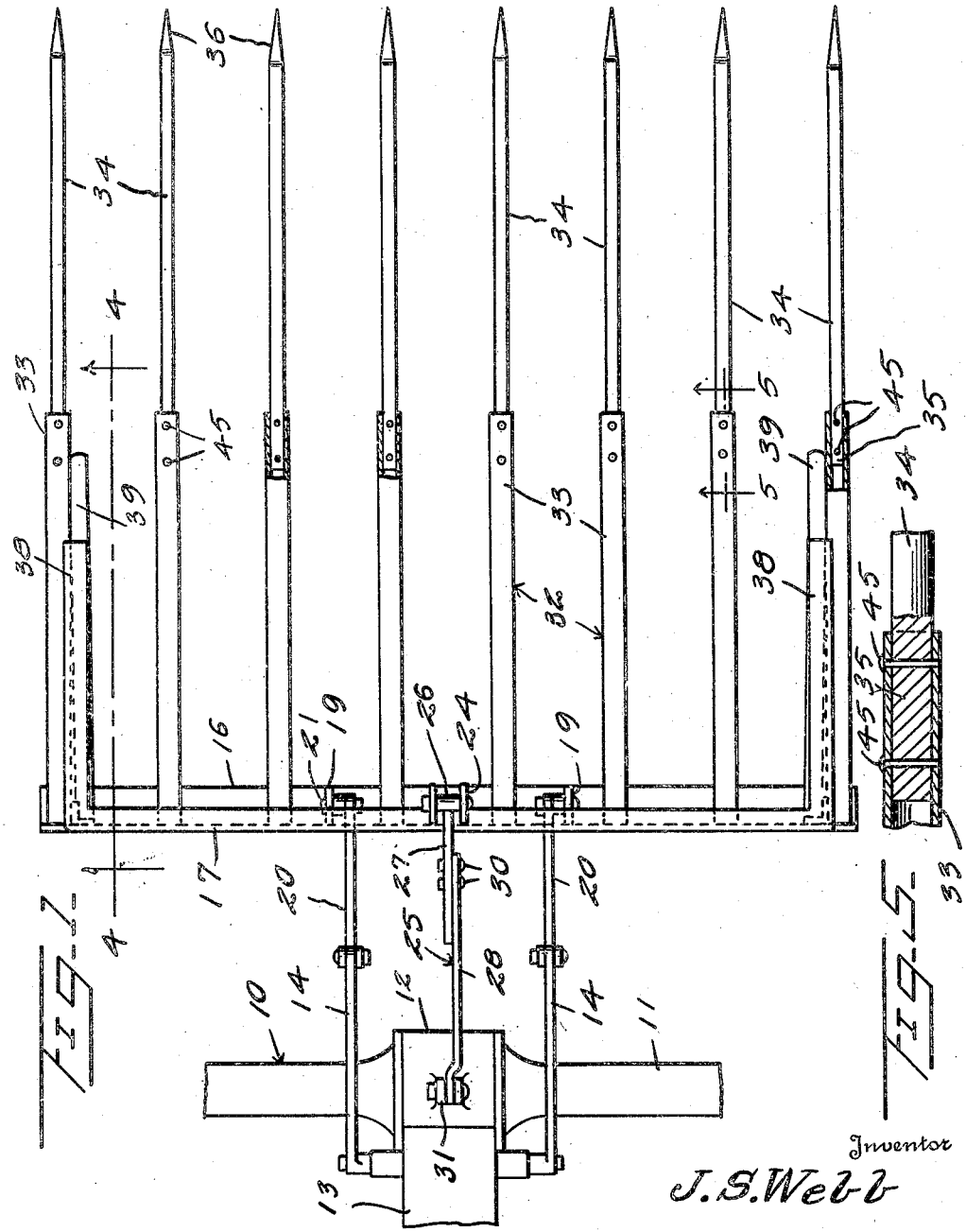

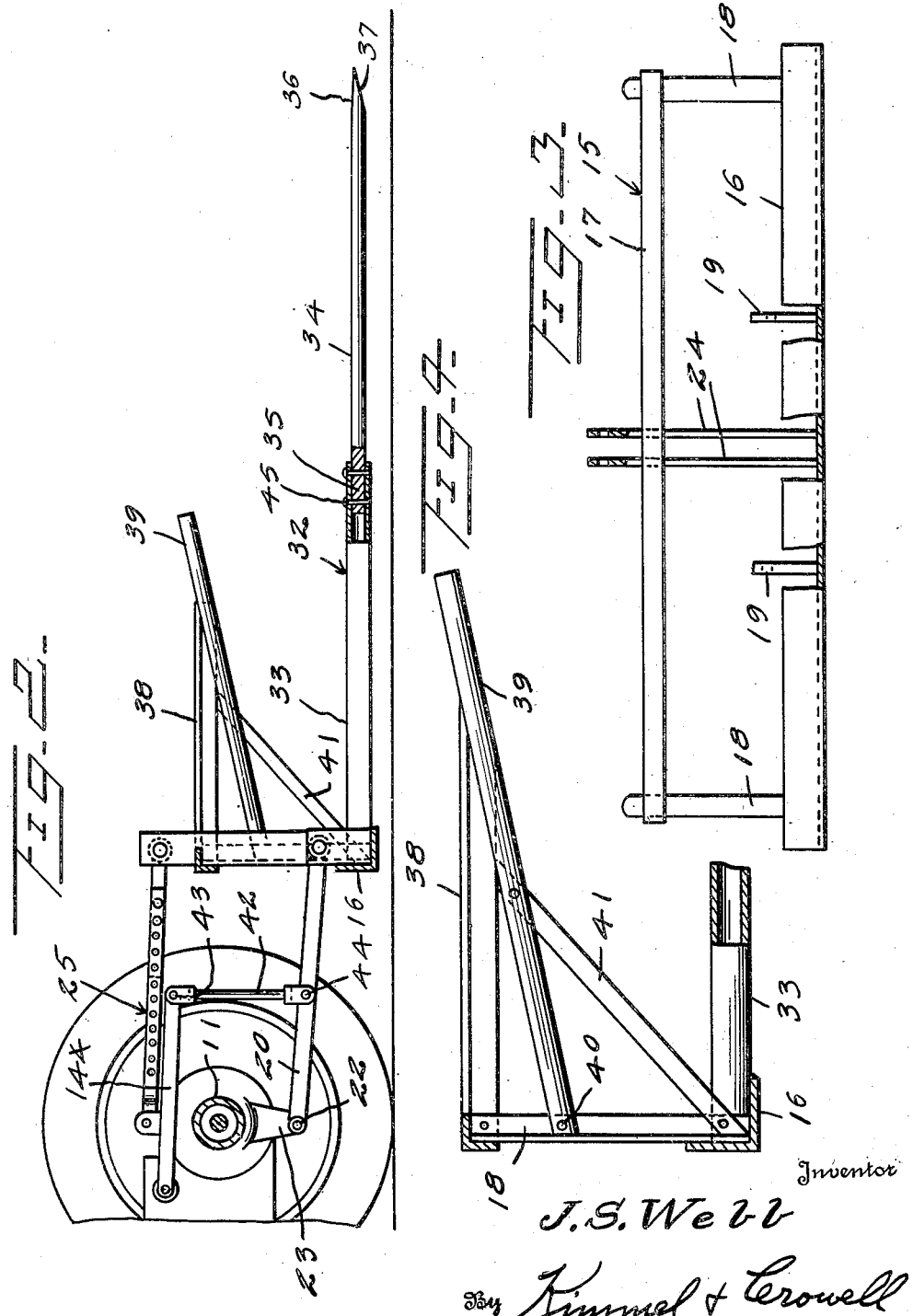

Patented Mar. 7, 1950

2,499,550

UNITED STATES PATENT OFFICE 2,499,550

HAY AND BRUSH RAKE

James S. Webb, Demopolis, Ala.

Application July 15, 1946, Serial No. 683,757

9 Claims. (Cl. 56—27)

This invention relates to a rake attachment for tractors.

An object of this invention is to provide a rake attachment for a tractor which is adapted to be mounted on the rear of the tractor, whereby hay, brush or the like may be picked up and shifted to the desired point.

Another object of this invention is to provide an improved rake structure including replaceable tines which may be formed of wood or the like.

A further object of this invention is to provide a rake structure of simple construction which is adapted to be mounted on the rear of a tractor and to project rearwardly therefrom, the tractor being movable reversely to pick up the material and then being movable forwardly to shift the loaded rake to the desired point.

With the above and other objects in view, my invention consists in the arrangement, combination and details of construction disclosed in the drawings and specification, and then more particularly pointed out in the appended claims.

In the drawings, wherein similar reference characters designate similar parts throughout the respective views, Figure 1 is a detail plan view, partly broken away and in section, of a rake constructed according to an embodiment of this invention, Figure 2 is a longitudinal section through the device, Figure 3 is a rear end elevation, partly broken away, of the device removed from the tractor, Figure 4 is a fragmentary sectional view taken on the line 4—4 of Figure 1, Figure 5 is a sectional view taken on the line 5—5 of Figure 1.

Referring to the drawing, the numeral 10 designates generally a tractor having a rear axle housing 11, a differential 12, and a hydraulic lift 13. The lift 13 includes a pair of rearwardly extending lifting levers 14. The construction hereinbefore described is conventional in tractors.

A rake structure is adapted to be mounted as will be hereinafter described, on the rear of the tractor 10. This rake structure includes a transverse inner or rear frame generally designated as 15. The frame 15 includes a lower elongated transverse angle bar 16, an upper elongated transverse angle bar 17, and upright connecting angle bars 18 connecting the upper and lower angle bars together adjacent their ends. The frame 15 has fixed to the lower angle bar 16 a pair of upwardly extending ears 19 which are spaced on opposite sides of the center of the frame and forwardly extending lever arms 20 are pivotally secured as at 21 to the ears 19.

The forward ends of the arms 20 are pivotally secured as at 22 to downwardly extending ears 23 carried by the axle housing 11. The frame 15 also includes a pair of upright spaced apart parallel bars 24 which are fixed to the angle bars 16, 17, and a lengthwise adjustable linkage generally designated as 25 is pivotally secured as at 26 between the upper ends of the bars 24.

The linkage 25 includes a rear link member 27 and a forward link member 28. These link members 27, 28 are disposed in overlapping position and are formed with a plurality of spaced holes 29 through selected pairs of which fastening members 30 engage so as to adjust the length of the linkage 25. The forward end of the linkage 25 is pivotally secured to a pair of upstanding ears 31 which are carried by the axle housing 12. The linkage 25 cooperates with the levers 20 in maintaining the frame 15 in the desired upright position, or at an inclination to the vertical as may be desired.

The frame 15 has extending from the lower frame member 16 thereof a plurality of spaced apart parallel tines generally designated as 32. The tines 32 include a tubular member 33 which is welded or otherwise firmly secured to the angle member 16, having the inner end thereof resting on the horizontal side of the angle bar 16. The outer end of the tubular member 33 has mounted therein and projecting therefrom, a wooden tine 34. The tine 34 as shown in Figure 5, is round in transverse section and the inner end 35 fits and is extended into the outer end of the tubular member 33 and held therein by fastening means 45 which may be frangible or shear pins so that if the tine member 34 strikes a rock, tree, stump or other obstruction, the pins 45 will break or shear and the tine member 34 force into the tubular member 33. The outer end of the wooden tine member 34 is formed with a point 36 which may have an upwardly and outwardly inclined lower side 37 in order that the tines may readily ride over the surface of the ground without sticking thereinto.

The frame 15 also includes rearwardly extending angle members 38 secured at their inner ends to the upper angle member 17 and projecting rearwardly or outwardly therefrom in parallel relation to the tines 32. An upwardly and outwardly inclined tubular member 39 is fixed at its inner end as at 40 to an upright frame member 18 and may be fixed as by welding or the like to the outer or rear end of the upper frame member 38.

A bracing bar 41 is adapted to be secured between the inclined bar 39 and the lower portion of the upright frame member 18. These upwardly and rearwardly inclined bars 39 are substantially shorter in length than the tines 32 and form side rake members above the tines which will prevent material such as hay, brush or the like from sliding off of the tines as the rake is moved into the material to receive a load.

The rear ends of the lifting levers 14 are connected to the lower levers or links 20 by means of connecting links 42 which are pivotally secured as at 43 to the rear ends of the lifting levers 14 and as at 44 to the levers or links 20 between the ends of the latter.

In the use and operation of this rake structure, the rake is secured by means of the links or levers 20 and the linkage 25 to the rear of the tractor, the lifting levers 14 being connected by links 42 to the levers 20. The linkage 25 may be adjusted so that the tines 32 may be disposed in their lowermost position substantially parallel with the ground or at an upwardly and rearwardly inclination if the latter is desired. The tractor is backed into the hay, brush, or the like, so that the material will engage on the tines 32. After the rake has been loaded the lifting levers 14 may be raised, thereby raising the tines 32. The tines 32 will be raised substantially parallel with the ground if the tines are initially in this parallel position, the linkage 25 maintaining the tines in their original adjusted position relative to the surface of the ground. The outer tine members 34 are longer than the inner tine members 33 so that if the pins 45 break and the outer tine members 34 are pushed into the inner tubular members 33, a small portion of the wooden members 34 will project from the ends of the inner members 33 to permit their convenient withdrawal. This acts as a safety feature when pushing into hay or brush so that should the wooden tines 34 strike a hard obstacle, instead of breaking the wooden tine, the force shears the pins and pushes the round wooden tines back into the metallic tubular members or pipes 33. In this way, all one has to do is to pull the wooden tine out and replace the two shear pins and the rake is as good as new.

When it is desired to unload the material, the rake may be lowered to the ground surface and the tractor moved forward, the material standing while the tines are pulled from therebeer angle bars and upright end bars fixed between said upper and lower bars, a plurality of spaced parallel tines fixed to and extending from said lower bar, each of said tines comprising an inner tubular member, and an outer member projecting into said inner tubular member, and frangible means securing said outer member in said inner member.

2. A rake attachment for tractors comprising an inner frame formed of upper and lower angle bars, upright end bars fixed between said upper and lower bars, a plurality of spaced parallel tines fixed to and extending outwardly from said lower bar, an upper outwardly extending bar extending from the upper bar at each end of said frame, and an upwardly and outwardly extending bar fixed at its inner end to each end bar and said latter named upper bar and extending upwardly and outwardly beyond the same, said frame adapted to be mounted on a tractor.

3. A rake attachment for tractors comprising an inner frame formed of upper and lower angle bars, upright end bars fixed between said upper and lower bars, a plurality of spaced parallel tines fixed to and extending outwardly from said lower bar, an upper outwardly extending bar extending from each end of said frame, an upwardly and outwardly extending bar fixed at its inner end to each end bar and the outer end of each latter upper bar, a pair of intermediate vertical bars fixed between said first named upper and lower frame bars and extending above said frame, a link pivotally engaging at one end between the upper ends of said vertical bars, and means at the opposite end of said link for pivotally securing the same to a tractor.

4. A rake attachment for tractors comprising an inner frame formed of upper and lower angle bars, upright end bars fixed between said upper and lower bars, a plurality of spaced parallel tines fixed to and extending outwardly from said lower bar, an upper outwardly extending bar extending from each end of said frame, an upwardly and outwardly extending bar fixed at its inner end to an end bar, an upper link adapted to be pivotally secured at one end to a tractor in an upper position, means pivotally securing the other end of said link to said frame above the first upper bar, said link including extensible link sections whereby the angular position of said tines relative to the horizontal may be selectively adjusted.

5. A tine for hay and brush rakes having an inner frame, comprising an inner tubular member anchored at its inner end to the frame and an outer wooden member wooden member pushed back into the inner tubular member to prevent breaking of the outer wooden member, said latter member being longer than the tubular member to project therefrom when pushed back so that it may be pulled out and connected.

7. A rake attachment for tractors comprising an inner upright frame formed of upper and lower bars, upright end bars fixed between said upper and lower bars, a plurality of spaced parallel tines fixed to and extending outwardly from said lower bar, an upper link adapted to be pivotally secured at one end to a tractor, means pivotally securing the other end of said link to said frame at the top, said link including extensible link sections, lower links adapted to be pivotally secured at one end of each in a lower position to a tractor below the upper link, means pivotally securing the other ends of the lower links to the frame near the bottom and vertical links pivoted at their lower ends to the lower links between their ends and adapted to be pivotally secured to the outer ends of lift levers of a tractor lift.

8. A hay and brush rake having an upright inner frame and tines fixed to and extending forwardly from said frame, and means to couple said frame to a tractor and lift mechanism thereof comprising an upper lengthwise adjustable link pivoted to the top of the frame and adapted to be pivotally connected to the tractor at an elevated point, arms pivoted to the bottom of the frame and adapted to be pivotally connected to the tractor below the pivotal connection of the link thereto, and links pivotally connected to the arms between their ends and extending upwardly therefrom for pivotal connection to the lift mechanism.

9. A hay and brush rake having an upright rear frame of substantially rectangular configuration and spaced parallel tines fixed at their rear ends to and extending forwardly from said frame, and means to couple said frame to a tractor and lift mechanism thereof having lift levers, comprising a pair of upright bars fixed to the frame and extending above the same, upwardly extending ears rigid with the bottom portion of the frame on opposite sides of the upright bars, a lengthwise adjustable link pivoted to the upper ends of the bars and adapted to be pivotally connected to the tractor above the levers, a pair of arms pivoted to the ears and adapted to be pivotally connected to the tractor below the pivotal connection of the link thereto and the levers, and links pivotally connected to the arms between their ends and extending upwardly for pivotal connection to the lift levers.

JAMES S. WEBB.

REFERENCES CITED

The following references are of record in the file of this patent:

UNITED STATES PATENTS

| Number | Name | Date |
|---|---|---|
| 1,407,663 | Kouns | Feb. 21, 1922 |
| 1,571,398 | Durgin | Feb. 2, 1926 |
| 1,880,262 | Lauppe et al. | Oct. 4, 1932 |
| 2,138,711 | Rohwer | Nov. 29, 1938 |